(12) United States Patent
Mohri et al.

(10) Patent No.: US 12,370,631 B2
(45) Date of Patent: Jul. 29, 2025

(54) REPAIR WELDING CONTROL DEVICE THAT GENERATES A SECOND WELDING PROGRAM BY CORRECTING A FIRST WELDING PROGRAM BASED ON REPAIR PORTION INFORMATION

(71) Applicant: Panasonic Intellectual Property Management Co., Ltd., Osaka (JP)

(72) Inventors: Toshinari Mohri, Osaka (JP); Takamichi Komatsu, Osaka (JP); Kazuki Hanada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 765 days.

(21) Appl. No.: 17/562,512

(22) Filed: Dec. 27, 2021

(65) Prior Publication Data

US 2022/0118559 A1 Apr. 21, 2022

Related U.S. Application Data

(63) Continuation of application No. PCT/JP2020/023289, filed on Jun. 12, 2020.

(30) Foreign Application Priority Data

Jun. 28, 2019 (JP) ................. 2019-122450

(51) Int. Cl.
*B23K 9/095* (2006.01)
*B23K 31/12* (2006.01)
(Continued)

(52) U.S. Cl.
CPC ............ *B23K 31/125* (2013.01); *B23K 9/095* (2013.01); *B23K 9/0953* (2013.01);
(Continued)

(58) Field of Classification Search
CPC .... B23K 31/125; B23K 9/095; B23K 9/0953; B23K 9/0956; B23K 9/12; B23K 26/032;
(Continued)

(56) References Cited

U.S. PATENT DOCUMENTS

2006/0006156 A1* 1/2006 Huonker .............. B23K 26/244
219/121.64
2006/0213888 A1 9/2006 Suzuki et al.
(Continued)

FOREIGN PATENT DOCUMENTS

CN 102166752 8/2011
CN 103231162 8/2013
(Continued)

OTHER PUBLICATIONS

Notice of Reasons for Refusal issued Jan. 16, 2024 in corresponding Japanese Patent Application No. 2021-528193, with English language translation.
(Continued)

*Primary Examiner* — Robert E Fennema
*Assistant Examiner* — Marzia T Monty
(74) *Attorney, Agent, or Firm* — WENDEROTH, LIND & PONACK. L.L.P.

(57) ABSTRACT

A repair welding control device includes a processor. The processor is configured to acquire repair portion information indicating a welded portion where repair welding is performed among welded portions in a workpiece welded by a first welding program, and generate a second welding program by correcting the first welding program based on the repair portion information.

3 Claims, 5 Drawing Sheets

(51) Int. Cl.
    *B25J 9/16*        (2006.01)
    *B25J 11/00*     (2006.01)

(52) U.S. Cl.
    CPC ........... *B23K 9/0956* (2013.01); *B25J 9/1687* (2013.01); *B25J 11/005* (2013.01); *G05B 2219/32228* (2013.01)

(58) Field of Classification Search
    CPC .. B23K 26/0884; B23K 26/21; B23K 31/006; B23K 9/00; B23K 9/28; B23K 9/32; B23K 37/00; B23K 37/02; B23K 37/0252; B25J 9/1687; B25J 11/005; B25J 9/1697; B25J 9/16; B25J 9/1679; B25J 9/1682; G05B 2219/32228; G05B 2219/45066; G05B 2219/45104; G05B 2219/45135; G01B 11/24
    See application file for complete search history.

(56) References Cited

U.S. PATENT DOCUMENTS

2007/0247323 A1   10/2007   Tsubota et al.
2016/0207142 A1*  7/2016   Kawamoto ............ B23K 26/21
2017/0050269 A1*  2/2017   Nakagawa ........... B23K 26/082
2018/0031152 A1*  2/2018   Rajagopalan ............. F16L 9/02

FOREIGN PATENT DOCUMENTS

| | | |
|---|---|---|
| CN | 104588838 | 5/2015 |
| CN | 108971712 | 12/2018 |
| CN | 109664008 | 4/2019 |
| JP | 08-108276 | 4/1996 |
| JP | 2000-167666 | 6/2000 |
| JP | 2006-247663 | 9/2006 |
| JP | 2007-257177 | 10/2007 |
| JP | 2010-253538 | 11/2010 |
| JP | 2012-037487 | 2/2012 |
| JP | 2013-226602 | 11/2013 |

OTHER PUBLICATIONS

International Search Report issued Sep. 8, 2020 in International (PCT) Application No. PCT/JP2020/023289.

* cited by examiner

REPAIR WELDING CONTROL DEVICE THAT GENERATES A SECOND WELDING PROGRAM BY CORRECTING A FIRST WELDING PROGRAM BASED ON REPAIR PORTION INFORMATION

CROSS-REFERENCE TO RELATED APPLICATIONS

This is a continuation of International Application No. PCT/JP2020/023289 filed on Jun. 12, 2020, and claims priority from Japanese Patent Application No. 2019-122450 filed on Jun. 28, 2019, the entire content of which is incorporated herein by reference.

TECHNICAL FIELD

The present disclosure relates to a repair welding control device and a repair welding control method.

BACKGROUND ART

JP-A-2012-037487 discloses a shape inspection device for inspecting a shape of an inspection object using an imaging optical system, the shape inspection device includes: a projection unit configured to project slit light onto the inspection object; an imaging unit configured to image shape lines sequentially formed on the inspection object by scanning of the slit light; a point group data acquisition unit configured to acquire a three-dimensional shape of the inspection object as point group data based on imaging data of each of the sequentially formed shape lines; a cutting line setting unit configured to set a cutting line according to input to the inspection object displayed based on the point group data; and a cross-sectional shape calculation unit configured to calculate a cross-sectional shape of the inspection object at the cutting line based on the point group data corresponding to the cutting line.

SUMMARY OF INVENTION

The present disclosure provides a repair welding control device and a repair welding control method capable of controlling repair welding.

According to an aspect of the present disclosure, there is provided a repair welding control device including a processor, in which the processor is configured to acquire repair portion information indicating a welded portion where repair welding is performed among welded portions in a workpiece welded by a first welding program; and generate a second welding program by correcting the first welding program based on the repair portion information.

Further, according to an aspect of the present disclosure, there is provided a repair welding control device including a processor, in which the processor is configured to acquire repair portion information indicating a welded portion where repair welding is performed among welded portions in a workpiece welded by a first welding program; and determine a second welding program according to a welded portion based on the repair portion information.

Further, according to an aspect of the present disclosure, there is provided a repair welding control device including a processor, in which the processor is configured to acquire repair portion information indicating a welded portion where repair welding is performed among welded portions welded in a workpiece by a first welding program; and generate a second welding program by correcting the first welding program or determine a second welding program according to a welded portion based on the repair portion information in accordance with a predetermined branching condition.

Further, according to an aspect of the present disclosure, there is provided a repair welding control method using a device including a processor, in which the processor is configured to acquire repair portion information indicating a welded portion where repair welding is performed among welded portions in a workpiece welded by a first welding program; and generate a second welding program by correcting the first welding program based on the repair portion information.

Further, according to an aspect of the present disclosure, there is provided a repair welding control method using a device including a processor, in which the processor is configured to acquire repair portion information indicating a welded portion where repair welding is performed among welded portions welded in a workpiece by a first welding program; and determine a second welding program according to a welded portion based on the repair portion information.

Further, according to an aspect of the present disclosure, there is provided a repair welding control method using a device including a processor, and the repair welding control method includes: acquiring repair portion information indicating a welded portion where repair welding is performed among welded portions in a workpiece welded by a first welding program; and generating a second welding program by correcting the first welding program or determining a second welding program according to a welded portion based on the repair portion information in accordance with a predetermined branching condition.

According to the present disclosure, it is possible to provide a repair welding control device and a repair welding control method capable of controlling repair welding.

DESCRIPTION OF EMBODIMENTS

Background of Present Disclosure

In the technique of JP-A-2012-037487, an appearance inspection device can determine whether a shape of a welded portion is good or bad after main welding is performed. However, in a case where the shape is not good, it is currently determined by a welding operator who is a human whether repair can be performed by rewelding (repair welding), and the rewelding (repair welding) for the repair is performed by the welding operator.

Further, regarding the repair welding in the case where the defective portion of the welding can be determined, the welding operator who is a human also determines which portion on the workpiece is appropriate for the repair welding. Therefore, there is a potential problem that the quality is not stable due to a skill level difference or an erroneous determination of the welding operator.

Therefore, in the present disclosure, the device determines an appropriate start position and an appropriate end position on the defective shape portion of the workpiece subjected to the main welding for the repair welding, and performs the repair welding. Accordingly, the repair welding for improving and stabilizing the welding quality can be performed.

In order to perform the above-described repair welding not by manual welding but by a machine, a repair welding program for a welding machine to perform the repair welding is required, but an appropriate method for generating the repair welding program is not determined at present.

Therefore, in the present disclosure, a processor in the device generates or determines the repair welding program. Accordingly, the repair welding can be performed not by manual welding but by a machine.

Hereinafter, embodiments specifically disclosing configurations and operations of a repair welding control device and a repair welding control method according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy of the following description and to facilitate understanding of a person skilled in the art. The attached diagrams and the following description are provided in order for a person skilled in the art to sufficiently understand the present disclosure, and are not intended to limit the matters described in the scope of the claims.

Figure 1:
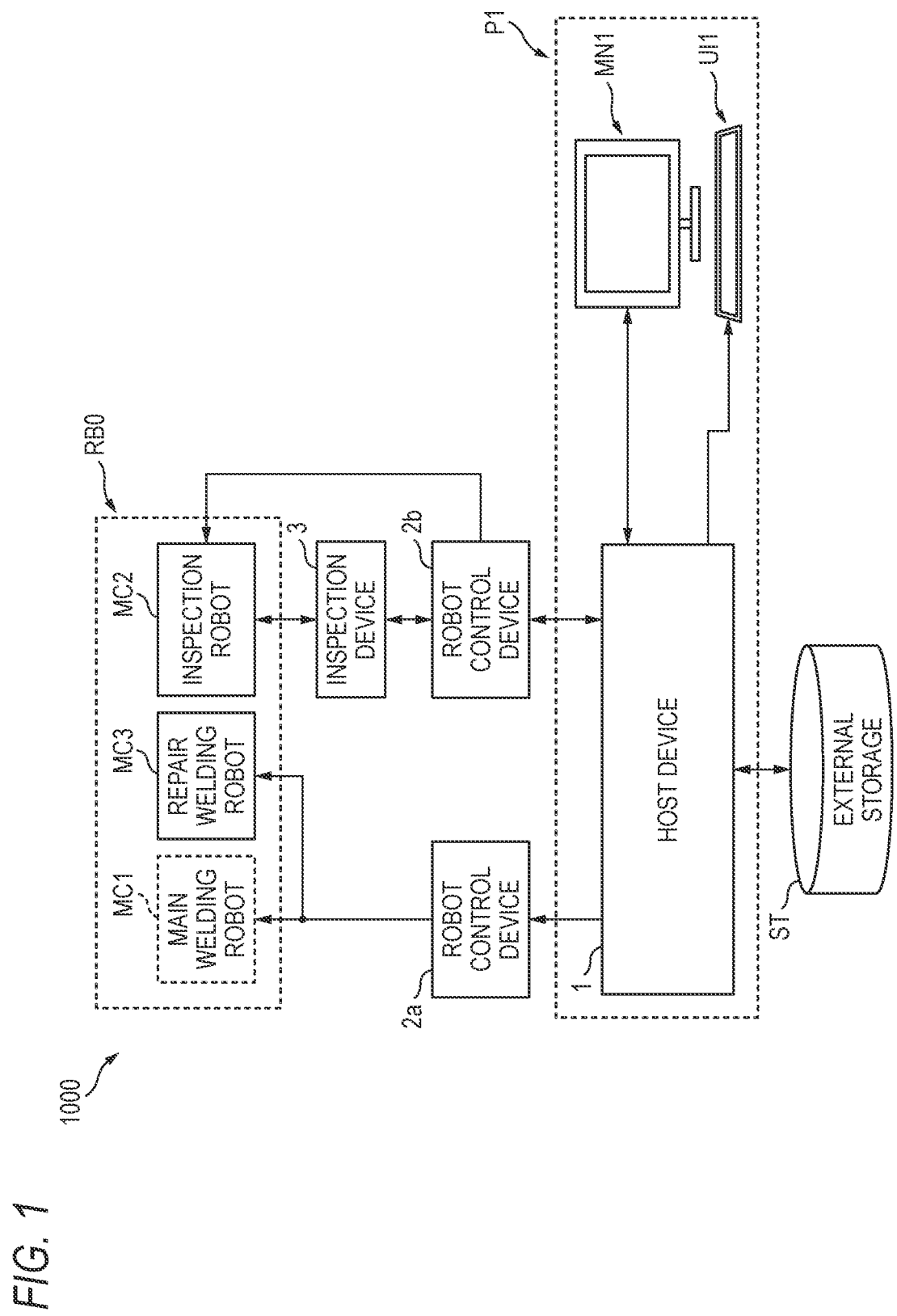
FIG. 1 is a schematic diagram showing a use case example of a repair welding system 1000 including a repair welding control device according to the present disclosure.

FIG. 1 is a schematic diagram showing an example of a use case of a repair welding system 1000 including the repair welding control device according to the present disclosure. The repair welding system 1000 according to the present disclosure is a system that performs, based on information input by a user or information related to welding set in advance, inspection of a welded portion actually main-welded to a workpiece Wk and repair welding (repair welding) of a defective portion determined to be defective among the welded portions. The system may perform the main welding in addition to the above-described inspection and repair welding.

The repair welding system 1000 may roughly include three devices of a robot (RB0) used for welding or inspection of a welding result, a controller that controls the robot or an inspection function of the robot, and a host device for the controller.

More specifically, the repair welding system 1000 may include a main welding robot MC1 that performs the main welding, an inspection robot MC2 that performs appearance inspection of a welded portion after the main welding, and a repair welding robot MC3 that performs repair welding when a defective portion is included in the welded portion after the main welding. Among them, the main welding robot MC1 and the repair welding robot MC3 can function as welding machines that perform welding. Each of the main welding robot MC1 and the repair welding robot MC3, which are welding machines, normally has an arm (see also a manipulator 200 of FIG. 2), and a head provided with a welding torch and the like moves. Further, the welding system may include a robot control device 2a, an inspection device 3, and a robot control device 2b as controllers for controlling the above-described various robots and inspection functions of the robots. In this use case example, the robot control device 2a or the robot control device 2b is a device that can correspond to the repair welding control device according to the present disclosure. However, the repair welding control device according to the present disclosure may be implemented as another device, and for example, a host device 1, the inspection device 3, and the like may correspond to a repair control device according to the present disclosure. Further, the repair welding system 1000 may include the host device 1 for the above-described controller. The host device 1 may be connected to a monitor MN1, an interface UI1, and an external storage ST.

Although not shown, the host device 1 or various control devices included in the controller may include a communication interface (wired or wireless) that performs communication with an external network. When these devices are connected to the external network, these devices can communicate with other devices (typically, a server, a PC, various sensor devices, and the like) existing on the external network.

In FIG. 1, the main welding robot MC1 is shown as a robot different from the repair welding robot MC3. However, the main welding robot MC1 may be omitted in a case where the repair welding system 1000 executes the inspection and the repair welding after the main welding is performed using another system or the main welding is performed manually.

Further, the main welding robot MC1 may be integrated with each of the repair welding robot MC3 and the inspection robot MC2. For example, the repair welding robot MC3 may execute, by the same robot, the main welding for welding the workpiece Wk and the repair welding for repairing the defective portion among the welded portions welded by the main welding. Further, for example, the inspection robot MC2 may execute, by the same robot, the main welding for welding the workpiece Wk and the inspection for inspecting whether there is a defective portion among the welded portions welded by the main welding.

The inspection robot MC2 and the repair welding robot MC3 may be integrated into one robot, and the main welding robot MC1, the inspection robot MC2, and the repair welding robot MC3 may be integrated into one robot.

In the repair welding system 1000 shown in FIG. 1, the number of each of the main welding robots MC1, the inspection robots MC2, and the repair welding robots MC3 is not limited to the number shown in FIG. 1. For example, the number of each of the main welding robots MC1, the inspection robots MC2, and the repair welding robots MC3 may be plural or may not be the same. For example, the repair welding system 1000 may include one main welding robot MC1, three inspection robots MC2, and two repair welding robots MC3. Accordingly, the repair welding system 1000 can be adaptively configured according to a processing range, a processing speed, and the like of each robot as necessary.

The host device 1 is communicably connected to the monitor MN1, the interface UI1, the external storage ST, the robot control device 2a, and the robot controller 2b. Further, although the host device 1 shown in FIG. 1 is connected to the inspection device 3 via the robot control device 2b, the host device 1 may be directly communicably connected to the inspection device 3 without using the robot control device 2b.

The host device 1 may be a terminal device P1 integrally configured to include the monitor MN1 and the interface UI1, or may be integrally configured to further include the external storage ST. In this case, the terminal device P1 is, for example, a personal computer (PC) used by a user (operator) in executing welding. The terminal device P1 is not limited to the PC described above, and may be a computer having a communication function, such as a smartphone, a tablet terminal, and a personal digital assistant (PDA).

The host device 1 generates each of control signals for executing the main welding, the inspection of the welded portion, and the repair welding of the defective portion on the workpiece Wk based on an input operation by a user (operator) or information set in advance by the user (operator). The host device 1 transmits, to the robot control device 2a, a control signal for executing the main welding on the generated workpiece Wk and a control signal for executing the repair welding on the defective portion. Further, the host device 1 transmits, to the robot control device 2b, a control signal for executing the inspection of the welded portion welded by the main welding.

The host device 1 may collect an inspection result of the welded portion received from the inspection device 3 via the robot control device 2b. The host device 1 transmits the received inspection result to the external storage ST and the monitor MN1. Although the inspection device 3 shown in FIG. 1 is connected to the host device 1 via the robot control device 2b, the inspection device 3 may be directly communicably connected to the host device 1.

The monitor MN1 may be configured using, for example, a display such as a liquid crystal display (LCD) or an organic electroluminescence (EL). The monitor MN1 displays the inspection result and an alert of the welded portion received from the inspection device 3. The monitor MN1 may be configured using, for example, a speaker (not shown), and may notify an alert by voice when the alert is received. That is, a form for performing the notification is not limited to the notification by visual information.

The interface UI1 is a user interface (UI) that detects an input operation of a user (operator), and is configured using a mouse, a keyboard, a touch panel, and the like. The interface UI1 transmits an input operation based on the input operation of the user to the host device 1. The interface UI1 receives, for example, input of a welding line, a setting of an inspection criteria according to the welding line, an operation of starting or ending an operation of the repair welding system 1000, and the like.

The external storage ST is configured using, for example, a hard disk drive (HDD) or a solid state drive (SSD). The external storage ST may store the inspection result of the welded portion received from the host device 1.

The robot control device 2a is communicably connected to the host device 1, the main welding robot MC1, and the repair welding robot MC3. The robot control device 2a receives the control information related to the main welding received from the host device 1, controls the main welding robot MC1 based on the received control information, and causes the main welding robot MC1 to execute the main welding on the workpiece Wk.

Further, the robot control device 2a receives the control information related to the repair welding received from the host device 1, controls the repair welding robot MC3 based on the received control information, and causes the repair welding robot MC3 to execute the repair welding on the defective portion determined to be defective by the inspection device 3 among the welded portions.

The robot control device 2a shown in FIG. 1 controls each of the main welding robot MC1 and the repair welding robot MC3. However, in the repair welding system 1000 according to first to third embodiments, for example, each of the main welding robot MC1 and the repair welding robot MC3 may be controlled using different control devices. Furthermore, in the repair welding system 1000 according to the first to third embodiments, the main welding robot MC1, the inspection robot MC2, and the repair welding robot MC3 may be controlled by a single control device.

The robot control device 2b is communicably connected to the host device 1, the inspection device 3, and the inspection robot MC2. The robot control device 2b receives information (for example, position information of a welded portion) related to the welded portion received from the host device 1. The welded portion includes a welded portion on the workpiece Wk (that is, a portion welded by the main welding) and a welded portion repaired and welded by the repair welding. The robot control device 2b controls the inspection robot MC2 based on the received information related to the welded portion, and causes the inspection robot MC2 to detect a shape of a welding bead in the welded portion. Further, the robot control device 2b transmits the received information related to the welded portion to the inspection device 3 that inspects a shape of the welded portion. The robot control device 2b transmits the inspection result received from the inspection device 3 to the host device 1.

The inspection device 3 is communicably connected to the robot control device 2b and the inspection robot MC2. The inspection device 3 inspects (determines) the presence or absence of a welding defect in the welded portion based on the information related to the welded portion received from the robot control device 2b and shape data of the welding bead of the welded portion generated by a shape detection unit 500 (see FIG. 2). The inspection device 3 transmits, to the robot control device 2b as an inspection result, information (for example, a range of a defective portion, position information of the defective portion, a defect factor, and the like may be included) related to a defective portion determined to be defective among the welded portions acquired by the inspection (determination). Further, when it is determined that the defective portion can be repair-welded, the inspection device 3 may also transmit information such as a type of repair, a parameter for performing repair welding, and the like to the robot control device 2b as the inspection result. The inspection device 3 may be directly communicably connected to the host device 1. In this case, the inspection device 3 may be able to transmit the above-described information to the host device 1 without using the robot control device 2b.

In FIG. 1, the robot control device 2b and the inspection device 3 are described as separate bodies, but the robot control device 2b and the inspection device 3 may be integrated into a single device.

The main welding robot MC1 is a robot that is communicably connected to the robot control device 2a and executes welding (main welding) on a workpiece that has not been subjected to welding processing. The main welding robot MC1 executes the main welding on the workpiece Wk based on the control signal received from the robot control device 2a.

The inspection robot MC2 is communicably connected to the robot control device 2b and the inspection device 3. The inspection robot MC2 acquires the shape data of the welding bead of the welded portion based on the control signal received from the robot control device 2b.

The repair welding robot MC3 is communicably connected to the robot control device 2a. The repair welding robot MC3 executes the repair welding on the defective portion based on the inspection result of the welded portion (that is, information related to the defective portion) received from the robot control device 2a.

Figure 2:
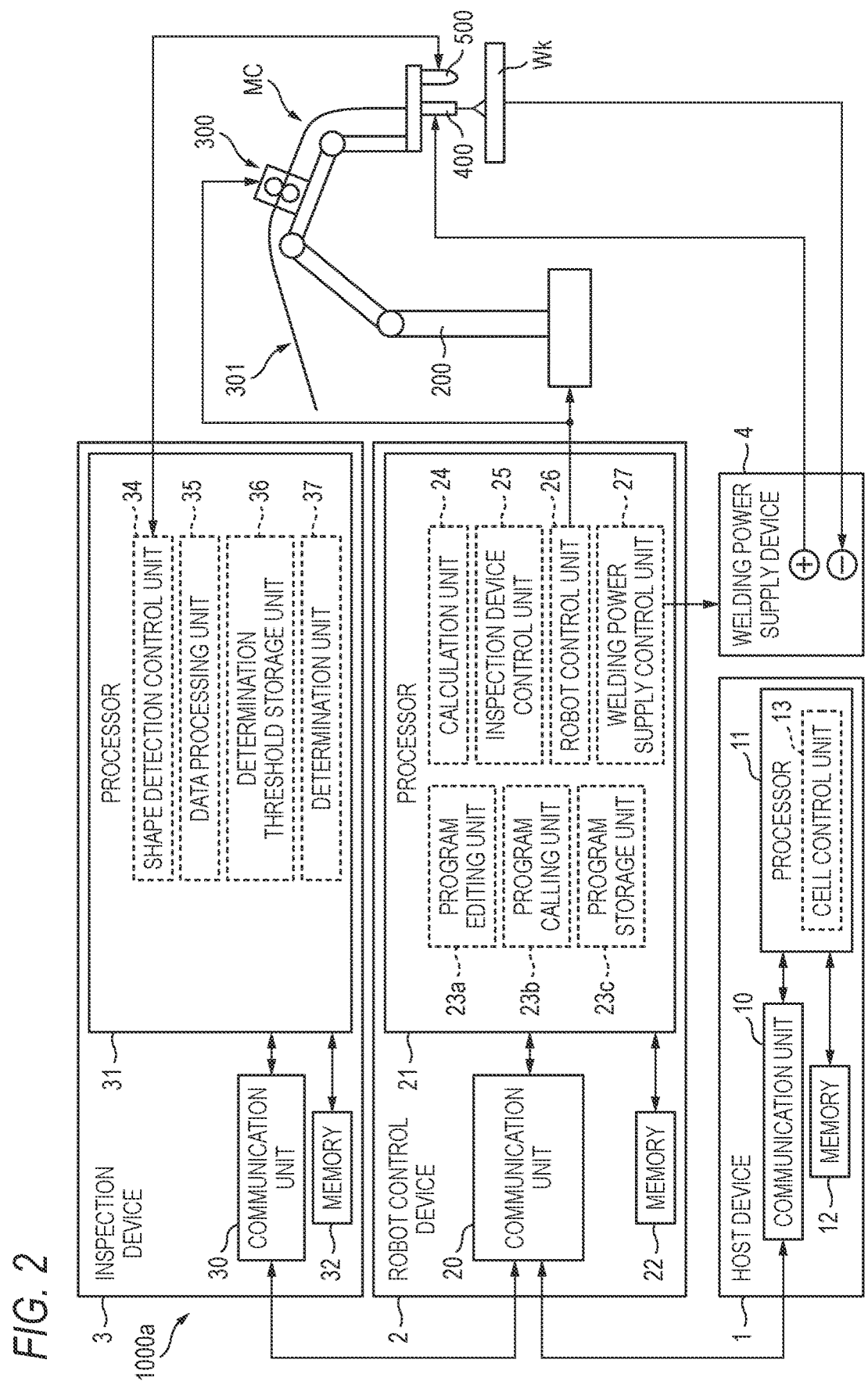
FIG. 2 is a diagram showing an internal configuration example of a repair welding system 1000a including a repair welding control device related to control of a robot MC according to first to third embodiments.

FIG. 2 is a diagram showing an internal configuration example of a repair welding system 1000a including a repair welding control device related to control of a robot MC according to the first to third embodiments. In this figure, a robot control device 2 may correspond to the repair welding control device according to the present disclosure. However, the inspection device 3, the host device 1, and the like may correspond to the repair welding control device according to the present disclosure. The robot MC shown in FIG. 2 is a robot in which the main welding robot MC1, the inspection robot MC2, and the repair welding robot MC3 shown in FIG. 1 are integrated. Further, in order to make the description easy to understand, configurations related to the monitor MN1, the interface UI1, and the external storage ST are omitted.

Configuration Example of Robot MC

The robot MC performs main welding on the workpiece Wk based on a control signal received from the robot control device 2. The robot MC executes inspection of a welded portion in the workpiece Wk after the main welding is performed. Further, the robot MC performs repair welding on a welding defective portion in the welded portion of the workpiece Wk based on the control signal received from the robot control device 2.

In this example, the robot MC is a robot that performs arc welding. However, the robot MC may be, for example, a robot that performs laser welding and the like other than the arc welding. In this case, although not shown, instead of a welding torch 400, a laser head may be connected to a laser oscillator via an optical fiber.

In the example, the robot MC that performs the arc welding includes the manipulator 200, a wire feeding device 300, a welding wire 301, the welding torch 400, and the shape detection unit 500.

The manipulator 200 includes an articulated arm, and the arm moves based on a control signal received from a robot control unit 26 of the robot control device 2. As a result, positions and moving speeds of the welding torch 400 and the shape detection unit 500 can be controlled. An angle of the welding torch 400 with respect to the workpiece Wk can also be changed by the movement of the arm.

The wire feeding device 300 controls a feeding speed of the welding wire 301 based on the control signal received from the robot control device 2. The wire feeding device 300 may include a sensor capable of detecting a remaining amount of the welding wire 301.

The welding wire 301 is held by the welding torch 400, and when electric power is supplied to the welding torch 400 from a welding power supply device 4, an arc is generated between a tip end of the welding wire 301 and the workpiece Wk to perform the arc welding. The illustration and description of the configuration and the like for supplying shielding gas to the welding torch 400 are omitted for convenience of description.

The shape detection unit 500 included in the robot MC detects a shape of a welding bead in the welded portion based on the control signal received from the robot control device 2, and acquires shape data for each welding bead based on a detection result. The robot MC transmits the acquired shape data for each welding bead to the inspection device 3.

The shape detection unit 500 is, for example, a three-dimensional shape measurement sensor. The shape detection unit 500 includes a laser light source (not shown) configured to be able to scan the welded portion on the workpiece Wk based on position information of the welded portion received from the robot control device 2, and a camera (not shown) disposed to be able to image an imaging region including the periphery of the welded portion and configured to image a reflection trajectory (that is, a shape line of the welded portion) of the reflected laser light among the laser light emitted to the welded portion. The shape detection unit 500 transmits, to the inspection device 3, the shape data (image data) of the welded portion based on the laser light imaged by the camera.

The above-described camera (not shown) includes at least a lens (not shown) and an image sensor (not shown). The image sensor is, for example, a solid-state imaging device such as a charge-coupled device (CCD) or a complementary metal oxide semiconductor (CMOS), and converts an optical image formed on an imaging surface into an electric signal.

(Host Device)

Next, the host device 1 will be described. The host device 1 generates a control signal for executing repair welding based on an input operation by a user (operator) or information set in advance by the user (operator), and transmits the generated control signal to the robot control device 2. The host device 1 includes a communication unit 10, a processor 11, and a memory 12.

The communication unit 10 is communicably connected to the robot control device 2. The communication unit 10 transmits the control signal for executing the repair welding to the robot control device 2. The control signal for executing the repair welding referred to here may include a control signal for controlling each of the manipulator 200, the wire feeding device 300, and the welding power supply device 4.

The processor 11 is configured using, for example, a central processing unit (CPU) or a field programmable gate array (FPGA), and performs various processing and control in cooperation with the memory 12. Specifically, the processor 11 implements a function of a cell control unit 13 by referring to a program and data stored in the memory 12 and executing the program.

The cell control unit 13 generates a control signal for executing the repair welding based on an input operation by a user (operator) using the interface UI1 and information set in advance by the user (operator) and stored in the external storage ST. The control signal generated by the cell control unit 13 is transmitted to the robot control device 2 via the communication unit 10.

The memory 12 includes, for example, a random access memory (RAM) as a work memory used when each processing of the processor 11 is executed, and a read only memory (ROM) that stores a program and data defining an operation of the processor 11. Data or information generated or acquired by the processor 11 is temporarily stored in the RAM. A program that defines the operation of the processor 11 is written in the ROM.

Further, the memory 12 stores an information type related to the workpiece Wk, a workpiece serial number (S/N) given in advance for each workpiece Wk, a welding line ID given for each welded portion (welding line) set by the user, and the like.

(Robot Control Device 2)

Next, the robot control device 2 will be described. The robot control device 2 controls each of the manipulator 200, the wire feeding device 300, and the welding power supply device 4 based on the control signal received from the host device 1. The robot control device 2 includes a communication unit 20, a processor 21, and a memory 22. The processor 21 includes a program editing unit 23a, a program calling unit 23b, a program storage unit 23c, a calculation unit 24, an inspection device control unit 25, a robot control unit 26, and a welding power supply control unit 27.

The communication unit 20 is communicably connected to the host device 1. The communication unit 20 receives, from the host device 1, a control signal for executing main welding, repair welding, and appearance inspection by the inspection device 3.

The processor 21 is configured using, for example, a CPU or an FPGA, and performs various processing and control in cooperation with the memory 22. Specifically, the processor 21 refers to a program and data stored in the memory 22, and executes the program to implement the functions of the respective units. The respective units are the program editing unit 23a, the program calling unit 23b, the program storage unit 23c, the calculation unit 24, the inspection device control unit 25, the robot control unit 26, and the welding power supply control unit 27. The functions of the respective units are, for example, a function of editing and calling a repair welding program for executing repair welding stored in advance, a function of generating a control signal for controlling each of the manipulator 200, the wire feeding device 300, and the welding power supply device 4 based on the called repair welding program, and the like.

The memory 22 includes, for example, a RAM as a work memory used when each processing of the processor 21 is executed, and a ROM that stores programs and data defining the operation of the processor 21. Data or information generated or acquired by the processor 21 is temporarily stored in the RAM. A program that defines the operation of the processor 21 is written in the ROM.

The program editing unit 23a edits a program (control signal) for executing repair welding based on information (for example, a determination result by the inspection device 3) related to a defective portion received from the inspection device 3 via the communication unit 20. The program editing unit 23a refers to a repair welding basic program (welding program for main welding) for executing repair welding stored in advance in the program storage unit 23c, and edits the repair welding program according to the received position and defect factor of the defective portion, parameters (repair parameters) for the repair welding, and the like. The edited repair welding program may be stored in the program storage unit 23c, or may be stored in the RAM and the like in the memory 22.

The repair welding program may include parameters such as a current, a voltage, an offset amount, a speed, a posture, and a method for controlling the welding power supply device 4, the manipulator 200, the wire feeding device 300, the welding torch 400, the shape detection unit 500, and the like when executing the repair welding.

The program calling unit 23b calls various programs stored in the ROM included in the memory 22, the program storage unit 23c, and the like. The program calling unit 23b may call a program on the robot MC side. Further, the program calling unit 23b can select and call an appropriate program from a plurality of programs according to the inspection result (determination result) by the inspection device 3. That is, the program calling unit 23b can change the program according to the inspection result (determination result) by the inspection device 3.

The program storage unit 23c stores various programs used by the robot control device 2. For example, the above-described repair welding basic program (welding program for main welding), the repair welding program edited by the program editing unit 23a, and the like may be stored in the program storage unit 23c.

The calculation unit 24 is a functional block that performs various calculations. For example, based on the repair welding program, calculations and the like for controlling the manipulator 200 and the wire feeding device 300 controlled by the robot control unit 26 are performed. Further, the calculation unit 24 may calculate an offset amount necessary for the repair welding for the defective portion based on the position of the defective portion.

The inspection device control unit 25 generates a control signal for controlling the inspection device 3. The control signal is transmitted to the inspection device 3 via the communication unit 20. On the contrary, the inspection device control unit 25 receives various types of information from the inspection device 3 via the communication unit 20, and performs various processing such as editing the repair welding program based on the information (program editing unit 23a) and transmitting a notification to the host device 1.

The robot control unit 26 drives each of the manipulator 200 and the wire feeding device 300 based on the repair welding program called by the program calling unit 23b or stored in the program storage unit 23c or a calculation result from the calculation unit 24. The welding power supply control unit 27 drives the welding power supply device 4 based on the repair welding program called by the program calling unit 23b or stored in the program storage unit 23c or the calculation result from the calculation unit 24.

In a case of a configuration in which the inspection robot MC2 and the repair welding robot MC3 are separated from each other, the information related to the defective portion may be transmitted from the inspection device 3 connected to the inspection robot MC2 to the robot control device 2 connected to the repair welding robot MC3 via the host device 1. The program editing unit 23a of the robot control device 2 connected to the repair welding robot MC3 may edit a program (control signal) for executing the repair welding based on information (for example, a determination result by the inspection device 3 to be described later) related to the defective portion received from the host device 1 via the communication unit 20.

Further, in the above configuration example, a form in which the program editing unit 23a and the program calling unit 23b are provided on the robot control device 2 side has been described. However, the program editing unit and the program calling unit may be provided on the inspection device 3 side. In this case, the inspection device 3 may call the above-described program or edit the repair welding program. A calling source of the program is not limited to the inside of the inspection device 3, and a program may be called from the robot control device 2, the robot MC connected to the robot control device 2, and the like. The called program is edited by the program editing unit. The edited program is transmitted from the inspection device 3 to the robot control device 2 as a repair welding program, and the robot control device 2 can perform repair welding using the repair welding program.

(Inspection Device 3)

Next, the inspection device 3 will be described. The inspection device 3 inspects (determines) the welded portion of the workpiece Wk based on the shape data of the welding bead for each welded portion acquired by the shape detection unit 500.

The inspection device 3 includes a communication unit 30, a processor 31, a memory 32, a shape detection control unit 34, a data processing unit 35, a determination threshold storage unit 36, and a determination unit 37.

The communication unit 30 is communicably connected to the robot control device 2. The communication unit 30 may be directly communicably connected to the host device 1. The communication unit 30 receives information related to the welded portion (welding line) from the host device 1 or the robot control device 2. The information related to the welded portion may include, for example, a workpiece type, the workpiece S/N, the welding line ID, and the like.

Further, the inspection device 3 transmits the inspection result of the welded portion to the host device 1 or the robot control device 2 via the communication unit 30.

The processor 31 is configured using, for example, a CPU or an FPGA, and performs various processing and control in cooperation with the memory 32. Specifically, the processor 31 refers to a program and data stored in the memory 32, and executes the program to implement the functions of the respective units. Each unit includes the shape detection control unit 34, the data processing unit 35, the determination threshold storage unit 36, and the determination unit 37. The function of each unit is, for example, a function of controlling the shape detection unit 500 based on a control signal related to inspection corresponding to the welded portion received from the robot control device 2, a function of generating image data based on the shape data of the welding bead received from the shape detection unit 500, a function of executing the inspection on the welded portion based on the generated image data, and the like.

In a case of performing machine learning, the processor 31 may include, for example, a plurality of GPUs for calculation. In this case, the processor 31 may be used in combination with the above-described CPU and the like.

The memory 32 includes, for example, a RAM as a work memory used when each processing of the processor 31 is executed, and a ROM that stores programs and data defining the operation of the processor 31. Data or information generated or acquired by the processor 31 is temporarily stored in the RAM. A program that defines the operation of the processor 31 is written in the ROM. Further, the memory 32 may include, for example, a hard disk drive (HDD) or a solid state drive (SSD).

The shape detection control unit 34 controls the shape detection unit 500 based on the shape data of the welding bead in the welded portion received from the shape detection unit 500 and the control signal related to the inspection corresponding to the welded portion received from the robot control device 2. When the shape detection unit 500 is located at a position at which the shape detection unit 500 can image the welded portion (shape detection is possible), the shape detection control unit 34 causes the laser beam to be emitted to acquire the shape data of the welding bead in the welded portion. When the shape detection control unit 34 receives the shape data acquired by the shape detection unit 500, the shape detection control unit 34 outputs the shape data to the data processing unit 35.

The data processing unit 35 converts the shape data of the welding bead in the welded portion received from the shape detection control unit 34 into image data. The shape data is, for example, point group data of a shape line including a reflection trajectory of a laser beam emitted to a surface of the welding bead. The data processing unit 35 executes statistical processing on the received shape data, and generates image data related to the shape of the welding bead in the welded portion. In order to emphasize the position and shape of the welding bead, the data processing unit 35 may perform edge emphasis correction in which a peripheral edge portion of the welding bead is emphasized.

The determination threshold storage unit 36 stores each threshold set according to the welded portion in order to execute the determination according to the welded portion. Each threshold is, for example, an allowable range (threshold) related to a positional shift of the welded portion, a threshold related to a height of the welding bead, a threshold related to a width of the welding bead. Further, the determination threshold storage unit 36 stores, as each threshold after the repair welding, an allowable range (for example, a minimum allowable value, a maximum allowable value, and the like related to the height of the welding bead) to the extent that the quality required by a customer is satisfied.

Further, the determination threshold storage unit 36 may store an upper limit value of the number of times of inspection for each welded portion. Accordingly, the inspection device 3 can determine that it is difficult or impossible to repair the defective portion by the repair welding when the number of times of inspection exceeds a predetermined number of times of inspection during repairing for the defective portion by the repair welding, and can prevent a decrease in an operation rate of the repair welding system 1000a.

The determination unit 37 refers to the threshold stored in the determination threshold storage unit 36, and determines the welded portion based on the shape data of the welding bead in the welded portion.

The determination unit 37 measures a position of the defective portion (for example, a start position and an end position of the defective portion, a position of a hole formed in the welding bead, a position of an undercut, and the like), analyzes a content of a defect, and estimates a defect factor. The determination unit 37 generates the measured position of the defective portion and the estimated defect factor as an inspection result (determination result) for the welded portion, and transmits the generated inspection result to the host device 1 via the robot control device 2.

When the determination unit 37 determines that there is no defective portion, the determination unit 37 may generate an alert notifying that there is no defective portion, and transmit the generated alert to the host device 1 via the robot control device 2. The alert transmitted to the host device 1 may be transmitted to and displayed on the monitor MN1.

Further, the data processing unit 35 counts the number of times of inspection for each welded portion, and when a welding inspection result is not good even if the number of times of inspection exceeds the number of times of inspection stored in the determination threshold storage unit 36, the data processing unit 35 determines that it is difficult or impossible to repair the defective portion by the repair welding. In this case, the determination unit 37 generates the alert including the position of the defective portion and the defect factor, and transmits the generated alert to the host device 1 via the robot control device 2. The alert transmitted to the host device 1 is transmitted to and displayed on the monitor MN1.

The inspection device 3 may generate an alert having contents other than those described above. The alert is also transmitted to the host device 1 via the robot control device 2. The alert transmitted to the host device 1 is transmitted to and displayed on the monitor MN1.

First Embodiment: Generation of Repair Welding Program

Figure 3:
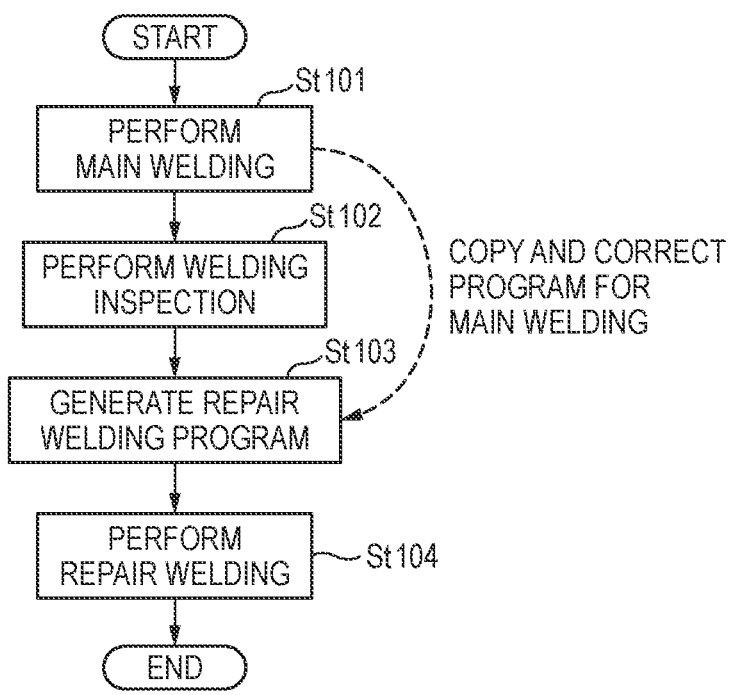
FIG. 3 is a flowchart showing a first processing example in which main welding, welding inspection, and repair welding according to an inspection result are performed.

FIG. 3 is a flowchart showing a first processing example in which main welding, welding inspection, and repair welding according to an inspection result are performed. As described above, the repair welding is performed by manual welding by a welding operator in the related art. Therefore, there is a potential problem of how to acquire a program (repair welding program) for the device to perform the repair welding. In the processing example shown in the flowchart of FIG. 3, a program for repair welding is generated based on a program for main welding.

First, the main welding is performed on the workpiece Wk (step St101). The main welding may be performed by the robot MC under the control of the robot control device 2 by using the welding program for main welding to be described later. Next, the inspection device 3 performs welding inspection on the workpiece Wk on which the main welding has been performed (step St102). The welding inspection may be performed by the processor 31 based on the shape data of the welding bead received from the shape detection unit 500.

In the welding inspection by the inspection device 3, for example, the determination unit 37 determines that a hole having a size exceeding a predetermined threshold included in the shape data of the welding bead to be inspected is a defective portion. A defect type of the defective portion is "hole". Further, the determination unit 37 compares the shape data of the welding bead to be inspected with master data recorded in the memory 32 and the like. When a length in a welding line direction of the welding bead to be inspected is shorter than a length in the welding line direction of the welding bead in the master data to the extent that the length exceeds the predetermined threshold, the determination unit 37 determines that there is a defective portion of the defect type "bead breakage". In addition to bead breakage, there are various defect types such as "undercut", "crack", "pit", "bead length (shift)", "bead height (shift)", and "welding line shift". The determination unit 37 compares the shape data of the welding bead to be inspected with the master data for each of these defect types. At the time of this comparison, it is determined whether there is a welding defect belonging to the defect type in the welding bead to be inspected by using the predetermined threshold. The predetermined threshold may be stored in the determination threshold storage unit 36.

In the present embodiment, the determination unit 37 determines whether welding is good or bad (good or bad determination) using a threshold. However, in addition to the above, a score for the welding bead to be inspected may be calculated and the good or bad determination of welding may be performed based on the score, or a determination model may be generated using machine learning and the good or bad determination of welding may be performed using the determination model.

For example, the processor 31 detects a defective portion for each defect type as described above, acquires or derives information related to the defective portion, and manages the information in association with a welding line (welding line ID). For example, the welding line ID, a start position and an end position of a defective portion, a defect type, information indicating whether repair welding is possible, and the like are associated with each other, and stored in the memory 32 and the like. That is, for each welded portion (welding line), information on defective portions included in the welded portion is collected. Then, repair portion information including information indicating a welded portion, which is included in the workpiece Wk and welded by the welding program for main welding and at which repair welding is performed by a welding machine (the robot MC in the present example), is transmitted from the inspection device 3 to the robot control device 2. The repair portion information may include all or a part of the above associated and managed information. For example, the repair portion information may include defective portion information. The defective portion information may include information such as a position of the defective portion in the welded portion, a start point and an end point of the defective portion, and a defect type. Further, the repair portion information may also include information indicating a welded portion included in the workpiece Wk, being a welded portion where the repair welding does not have to be performed by a welding machine (the robot MC in the present example) (that is, a welding result is good). The repair portion information may also include information other than the above information, and may include, for example, information acquired from the host device 1 or the robot control device 2.

The robot control device 2 that has received the repair portion information generates a repair welding program (step St103). The generation of the repair welding program will be described later. By using the generated repair welding program, the repair welding is performed on the workpiece Wk by the welding machine (the robot MC in the present example) (step St104).

The generation of the repair welding program in step St103 will be described later. In step St101, the main welding is performed on the workpiece Wk. The welding program for main welding, which is a program for the robot MC to perform the main welding, is stored in the memory 22 and the like. The welding program for main welding may be stored in, for example, the robot MC. The program calling unit 23b of the processor 21 calls the welding program for main welding and stores the welding program for main welding in the program storage unit 23c. That is, the processor 21 acquires the welding program for main welding. The program may be acquired not by acquiring original program data but by acquiring a copy of the program data (see a broken line arrow in FIG. 3).

Further, after the completion of step St102, the robot control device 2 receives the repair portion information from the inspection device 3. That is, the processor 21 acquires the repair portion information.

The processor 21 generates a repair welding program by correcting the welding program for main welding based on the repair portion information. The correction of the program is performed, for example, as will be described later.
(Correction of Welding Program for Main Welding)

The welding program for main welding is a program used in the main welding. For example, the workpiece Wk may include a plurality of welded portions (welding lines). There are a welding start point and a welding end point for each welded portion, and the robot MC performs welding from the welding start point to the welding end point. Further, in order for the robot MC to perform welding, parameters for the welding (welding parameters) are required. Examples of the parameters include a current, a voltage, an offset amount, a speed, a posture, and a method. The welding program for main welding may include these welding parameters, and controls the welding torch 400 and the like according to these parameters to perform welding.

Further, in general, there is a jig in an environment in which the welding is performed, and the welding program for main welding drives the robot MC so as to avoid contact with the jig and the like.

On the other hand, the repair welding is performed on the workpiece Wk on which a bead has already been formed after the main welding is performed. Here, as described above, the repair welding is performed by manual welding by a welding operator in the related art. On the other hand, in the case of the repair welding control device of the present disclosure, the repair welding can be performed by a machine by driving the welding machine (the robot MC in the present example) using the repair welding program.

The welding program for main welding is designed such that the robot MC does not collide (interfere) with a jig and the like as described above. Therefore, the program editing unit 23a included in the processor 21 generates a repair welding program by making necessary corrections to the welding program for main welding based on the welding program for main welding. For example, in the repair welding, unlike the main welding, it is not necessary to weld the entire portion indicated by the welding line, and it is sufficient to perform welding for a defective portion, and therefore, even if a trajectory along a welding direction is the same, a correction such as generating an arc only for a portion of the defective portion (in a case of arc welding) is performed. However, the above-described correction content is an example of the correction, and other corrections may be performed on the welding program for main welding.

The generated repair welding program may be a program for performing repair welding for each welding line. In the main welding, a portion indicated by a welding line is welded, but in the repair welding, welding may be performed on a defective portion included in the portion indicated by the welding line of the main welding. The program editing unit 23a may correct the welding program for main welding so as to perform welding on the defective portion.

Thus, the repair welding program can be easily generated. Further, the repair welding program generated in this manner does not collide (interfere) with a jig and the like. That is, there is an advantage that interference on the trajectory does not occur.

There may be a plurality of welded portions (welding lines) in the workpiece Wk, but welding defects do not occur in all of the welded portions. That is, a welded portion where a welding defect occurs and repair welding is necessary and a welded portion where a welding defect does not occur and repair welding is unnecessary may be mixed in the workpiece Wk. Then, since the repair portion information already acquired by the processor 21 includes the position information of the defective portion, the processor 21 can specify a welded portion (welding line) to be subjected to the repair welding and a welded portion (welding line) not to be subjected to the repair welding. Therefore, (the program editing unit 23a of) the processor 21 corrects the welding program for main welding based on the repair portion information so as to increase the moving speed of the welding machine (the robot MC and the like) for the welded portion where the repair welding is not performed in the workpiece Wk. As an example of the correction, a code for increasing a value of the parameter (speed) included in the welding program for main welding is added to the welding program for main welding. When the corrected program is used as the repair welding program, the robot MC moves at high speed at a welded portion (welding line) where repair welding is not necessary and a welding result is good. That is, a time required for the repair welding is shortened.

Further, since the repair welding is unnecessary for the welded portion (welding line) where the welding result is good, power supply to the welding torch 400 is also unnecessary for the welded portion, and the feeding of the welding wire 301 may also be temporarily stopped. Therefore, for example, the program editing unit 23a may correct parameters indicating a current and a voltage, turn off a feeding flag of the welding wire 301, and set a feeding speed of the welding wire to 0. Further, the manipulator 200 may be controlled so as to raise the position of the welding torch 400 and not to generate an arc at a welded portion where the welding result is good. Therefore, for example, the program editing unit 23a may correct a code related to the operation of the manipulator 200. For example, when the program editing unit 23a performs these program corrections, the welding machine (robot MC and the like) can be caused to run idle at a welded portion where repair welding is unnecessary.

Further, the welding of the welded portion in the main welding is performed in the welding direction along the welding line. Here, there may be a plurality of defective portions included in the welded portion. Therefore, in the repair welding, the welding may be performed in a direction opposite to the welding direction. For example, in a case where a welding defect is found in the rear half of the welding direction in the welded portion, the approach of the welding torch 400 to the defective portion becomes faster when the repair welding is performed from the direction opposite to the welding direction. Therefore, the program editing unit 23a corrects the welding program for main welding so as to change the welding direction with respect to the welding line to the opposite direction. As an example of the correction method, an internal parameter indicating the welding direction is changed. Accordingly, when the welding program for main welding is executed, the welding torch 400 can approach the defective portion faster even when the defective portion is located in the rear half of the welding direction, and therefore, there is an advantage that efficiency on tact is improved.

After the repair welding (step St104) is performed on the workpiece Wk, the welding inspection (step St102) may be performed again to re-inspect the welding bead after the repair welding. As a result of the re-inspection, if there is still a defective portion, the repair welding (step St104) may be performed again. The welding program used in the re-repair welding may be generated as described above based on the welding program used in the main welding (the broken line in FIG. 3), or may be newly generated as described above based on the repair welding program used in the previous repair welding. Further, when there is a program for repair welding generated in advance as used in the second embodiment described later, the program for repair welding may be newly generated based on the repair welding program.

Second Embodiment: Determination of Repair Welding Program

Next, the second embodiment will be described with reference to FIG. 4. In the first embodiment described above, the repair welding program is generated based on the welding program for main welding. On the other hand, in the second embodiment described later, the repair welding program is prepared in advance, and a suitable repair welding program is selected for each welded portion (welding line)

to perform repair welding. Similarly to the first embodiment, the second embodiment will be described later based on a system configuration example shown in FIG. 2.

Figure 4:
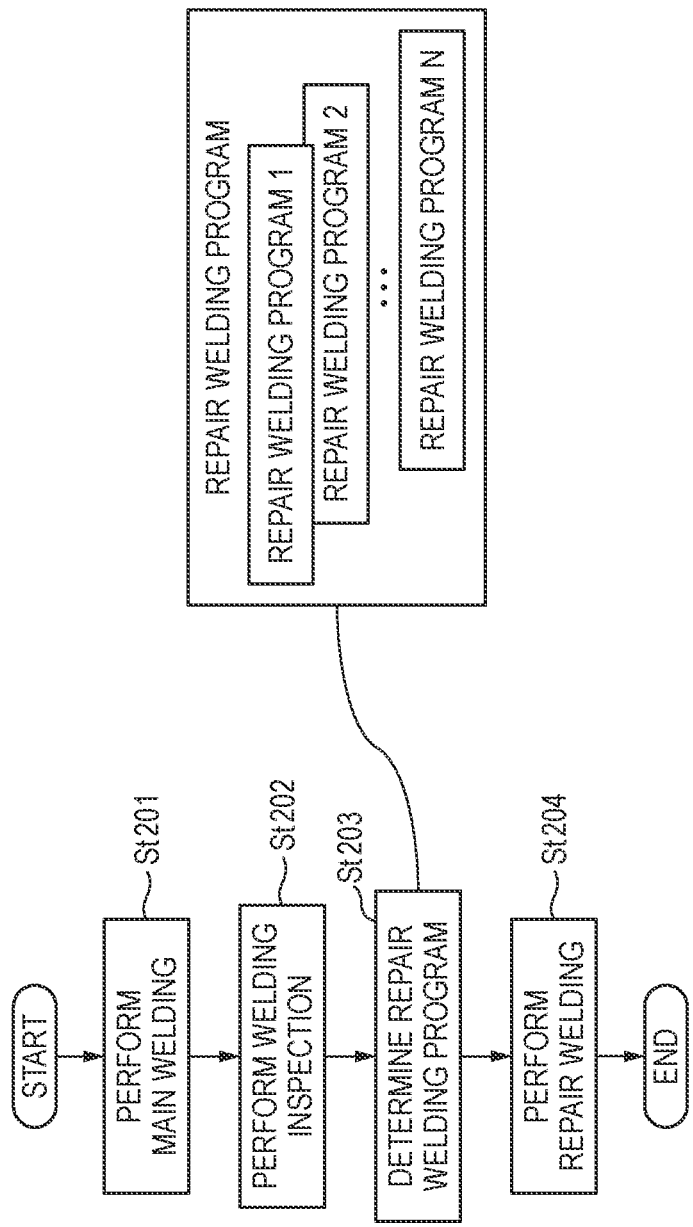
FIG. 4 is a flowchart showing a second processing example in which main welding, welding inspection, and repair welding according to an inspection result are performed.

FIG. 4 is a flowchart showing a second processing example in which main welding, welding inspection, and repair welding according to an inspection result are performed. As described above, there is a potential problem of how to acquire a program (repair welding program) for the device to perform the repair welding. In the processing example shown in FIG. 4, the program for repair welding is generated in advance, and an appropriate program is selected (determined) for each welded portion (welding line).

Since steps St201, St202, and St204 in FIG. 4 perform the same processing as steps St101, St102, and St104 in FIG. 3, respectively, the description thereof will be omitted.

Step St203 will be described. As shown on the right side of FIG. 4, a repair welding program is generated in advance. In this figure, a plurality of programs (repair welding programs 1 to N) are generated in advance as the repair welding program. However, only a single program may be generated.

Each of the repair welding programs 1 to N may be a program for performing repair welding on a defective portion included in a welded portion (welding line). That is, the workpiece Wk may include a plurality of welded portions (welding lines), but the processor 21 can select (determine) a different repair welding program for each welded portion.

Here, a shape and a dimension of the workpiece Wk or the welded portion included in the workpiece Wk are not necessarily the same. For example, even in a welded joint, there are modes of different joints such as a butt joint, a lap joint, and a T joint. Therefore, for each welded portion, a repair welding program suitable for the welded portion is generated in advance, and the processor 21 can perform flexible repair welding according to the welded portion by determining (selecting) an appropriate repair welding program. In the first embodiment shown in FIG. 3, the repair welding program is generated based on the welding program for main welding, and the welding program for main welding is originally designed in consideration of differences at each of the welded portions. Further, the welding program for main welding is designed such that a device (the robot MC and the like) that performs welding does not interfere (collide and the like) with a jig. If such a welding program for main welding is corrected to generate a repair welding program, appropriate repair welding can be performed.

Information indicating the shape and the dimension of the welded portion included in the workpiece Wk, the mode of the joint, and the like may also be included in the above-described repair portion information. Alternatively, the repair portion information may include the above-described welding line ID, and the robot control device 2 may extract information indicating the shape and the dimension of the welded portion, the mode of the joint, and the like from a table, a database, and the like, by using the welding line ID as a search key. A storage location of the table or the database may be the memory 22 of the robot control device 2, the memory 12 of the host device 1, an external server capable of communicating with the robot control device 2, and the like.

The processor 21 can determine the repair welding program which is to be used for the welded portion (welding line) based on the acquired repair portion information. Although the determination algorithm is not uniquely specified, the determination algorithm may be an algorithm for determining the repair welding program which is to be used based on the above-described repair portion information or information that can be further acquired based on the information.

An example of the determination algorithm of the repair welding program by the processor 21 is a logic table. For example, as data items serving as search keys in the table, the shape and the dimension of the welded portion, the mode of the joint, the defect type of the welding defect that frequently occurs at the welded portion, a restriction condition unique to the welded portion (for example, a moving speed limit of a welding torch), and the like are recorded in the logic table. Then, the number of an available repair welding program (for example, a repair welding program 3) is recorded in the logic table according to the search key. When a plurality of types of repair welding programs correspond to one search key, a data item indicating a priority order in the plurality of programs may be included in the logic table. The processor 21 can generate a search key from the acquired repair portion information and information that can be further acquired based on the information, and extract the program number of the available repair welding program for the welded portion from the logic table based on the search key.

As another example of the determination algorithm, the processor 21 may calculate a matching score for a welded portion for each repair welding program and determine (select) a repair welding program having a high (or low) score. Further, machine learning may be performed using a data set (teacher data) in which an image indicating the welded portion (an image based on the shape data acquired by the shape detection unit 500, and the like) and an appropriate repair welding program are combined, and a learning model may be generated in advance. In the latter case, the processor 21 selects the repair welding program by inputting an image indicating the welded portion acquired based on the repair portion information to the learning model.

For example, as described above, when the processor 21 appropriately determines (selects) the generated repair welding program, the welding robot (robot MC and the like) can be driven so as to draw a trajectory different from a trajectory of the welding bead formed by the welding program for main welding. For example, it is also possible to perform welding of a defective portion directly without following the original welding line. Therefore, more appropriate and efficient repair welding can be performed on the defective portion.

After the repair welding (step St104) is performed on the workpiece Wk, the welding inspection (step St102) may be performed again to re-inspect the welding bead after the repair welding. As a result of the re-inspection, if there is still a defective portion, the repair welding (step St104) may be performed again. In the re-repair welding, the processor 21 may select a welding program different from the repair welding program selected in the previous repair welding. Further, the program selected in the re-repair welding may be the repair welding program generated in the previous repair welding (see the first embodiment).

Third Embodiment: Combination of Generation and Determination of Repair Welding Program Next, the third embodiment will be described with reference to FIG. 5. In the first embodiment described above, the repair welding program is generated by correcting the welding program for main welding. In the second embodiment, the repair welding program generated in advance is selected as appropriate. The third embodiment to be described later is a combination of the first embodiment and the second embodiment. The third embodiment will be described later based on the system configuration example shown in FIG. 2.

Figure 5:
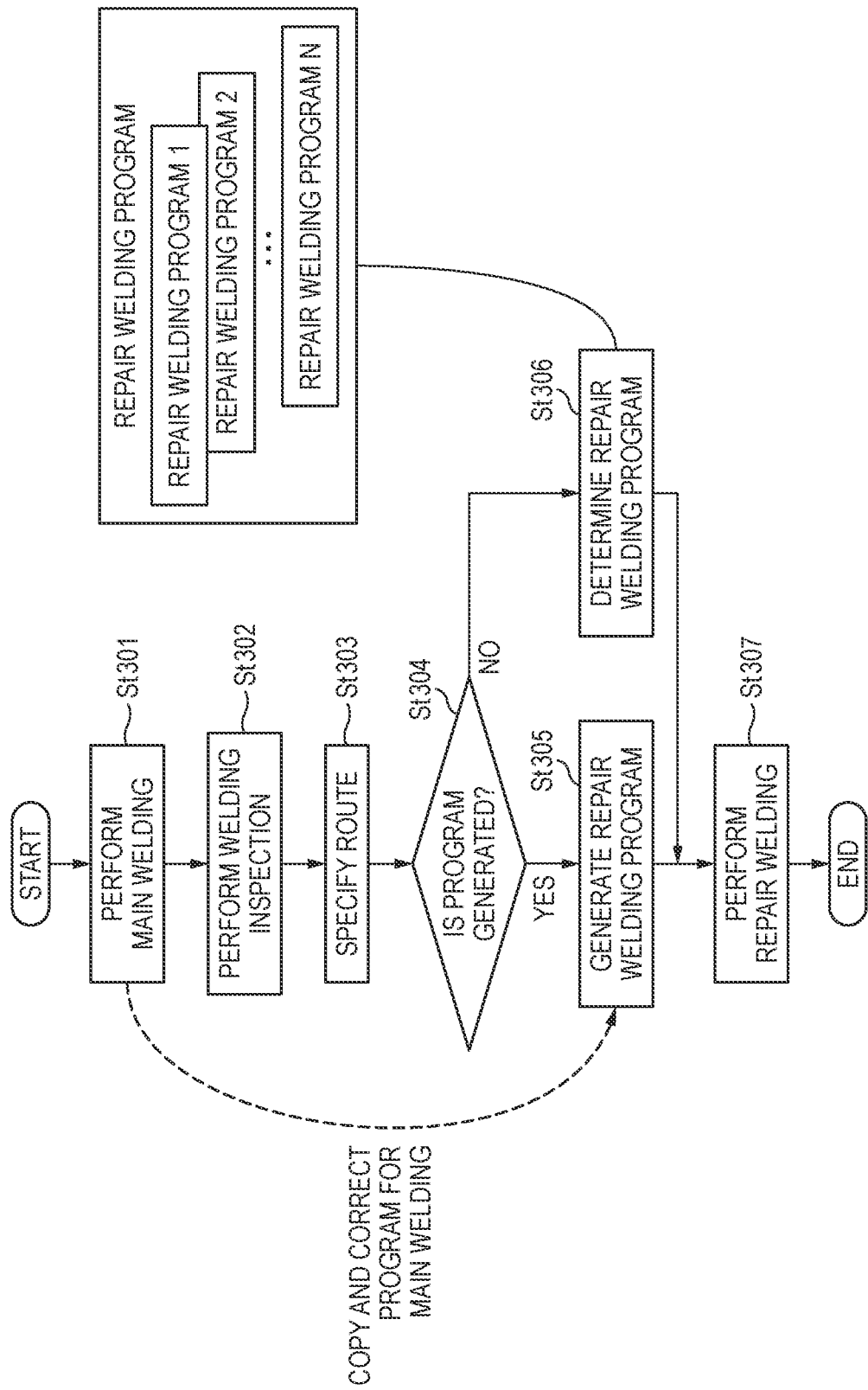
FIG. 5 is a flowchart showing a third processing example in which main welding, welding inspection, and repair welding according to an inspection result are performed.

FIG. 5 is a flowchart showing a third processing example in which main welding, welding inspection, and repair welding according to an inspection result are performed. Since steps St301, St302, and St307 in FIG. 5 perform the same processing as steps St101, St102, and St104 in FIG. 3, respectively, the description thereof will be omitted.

The processor 21 that has acquired the repair portion information specifies a route for performing repair welding based on the repair portion information (step St303). When the route is specified, the repair welding is performed along the route (step St307), but it is necessary to determine the repair welding program to be used to perform the repair welding. In step St304, the processor 21 determines whether to generate the repair welding program (step St305) or determine (select) the generated repair welding program (step St306) based on a predetermined branching condition (step St304).

A plurality of conditions for the processing branch in step St304 are conceivable. The first branching condition is the number of defective portions included in the welded portion. When the number of the defective portions included in the welded portion is larger than a predetermined threshold (step St304, Y), the repair welding program is generated (step St305). In a case where there are many defective portions included in the welded portion, it is necessary to perform repair welding on the many defective portions. This is because, in this case, it is considered preferable from the viewpoint of stability to generate a repair welding program by correcting a necessary portion based on the welding program for main welding that has already been stably operated so as to avoid interference with a jig and the like. On the other hand, when the number of defective portions is smaller than the predetermined threshold (step St304, N), the repair welding program that has already been generated is determined (selected) (step St306). This is because, in a situation in which there are few defective portions, it is easy to generate a dedicated program for repairing only the defective portions in advance. The number of defective portions included in the welded portion may be derived by the processor 21 based on the defective portion information included in the repair portion information, and the number of the defective portions may be calculated during the welding inspection (step St302) by the inspection device 3, and the number of the defective portions may be included in the defective portion information.

The second branching condition is a distance between the defective portions included in the welded portion. When defective portions in which the distance between the defective portions is smaller than the predetermined threshold are included in the welded portions (step St304, Y), the repair welding program is generated (step St305). In such a case, it is efficient to perform a repair welding method such as repair welding of all defective portions close in distance one another, and therefore, the welding method can be implemented by correcting the welding program for main welding. On the other hand, when defective portions in which the distance between the defective portions is smaller than the predetermined threshold are not included in the welded portions (step St304, N), the repair welding program that has already been generated is determined (selected) (step St306). This is because, since there is a certain distance between the defective portions, the defective portions can be individually dealt with by a program generated in advance.

The distance between the defective portions may be derived by the processor 21 based on the defective portion information (the start point information, the end point information, and the like of the defective portion) included in the repair portion information, the distance between the defective portions may be calculated during the welding inspection (step St302) by the inspection device 3, and the distance between the defective portions may be included in the defective portion information.

After the repair welding (step St104) is performed on the workpiece Wk, the welding inspection (step St102) may be performed again to re-inspect the welding bead after the repair welding. As a result of the re-inspection, if there is still a defective portion, the repair welding (step St104) may be performed again. In the re-repair welding, the processor 21 may generate a repair welding program based on the welding program (the welding program for main welding or the repair welding program) that can be acquired at this time (step St305). Further, in the re-repair welding, the processor 21 may determine (select) a welding program (including the welding program generated in step St103 of the first embodiment and the welding program generated in step St305 of the third embodiment) that can be selected at this time.

As described above, by generating the repair welding program or appropriately selecting the repair welding program that has already been generated according to the predetermined branching condition, more efficient repair welding can be performed according to the situation.

The first embodiment, the second embodiment, and the third embodiment have been described on the assumption that the processor 21 included in the robot control device 2 in the system configuration shown in FIG. 2 is a processing subject. However, the processing subject in the repair welding control device and the repair welding control method of the present disclosure is not limited thereto, and may be, for example, the inspection device 3 shown in FIG. 2. That is, the inspection device 3 includes the program editing unit 23a, the program calling unit 23b, the program storage unit 23c, and the like, and the processor 31 can perform the above-described processing as a processing subject. The repair welding program acquired as a result of the processing may be transmitted to the robot control device 2 via the communication unit 30, and the robot MC connected to the robot control device 2 may perform the repair welding based on the repair welding program.

Further, the repair welding control device may be a device other than the above, for example, the host device 1 or a device other than the host device 1. A device including a processor may acquire the above-described repair portion information, perform the above-described processing based on the repair portion information, and generate or determine (select) a repair welding program.

As described above, the processor 21 corrects a first welding program based on the repair portion information so as to increase the moving speed of the welding machine (robot MC and the like) at the welded portion where the repair welding is not performed in the workpiece Wk. Accordingly, the time required for the repair welding can be shortened.

Further, the processor 21 corrects the first welding program based on the repair portion information such that the welding machine (robot MC and the like) runs idle at the welded portion where the repair welding is not performed in the workpiece. Accordingly, the welding machine can be caused to run idle at a welded portion where repair welding is unnecessary.

Further, the processor 21 corrects the first welding program so as to change the welding direction to the opposite direction. Accordingly, when the welding program for main welding is executed, the welding torch 400 can approach the defective portion faster even when the defective portion is located in the rear half of the welding direction, and the efficiency on tact is improved.

Further, the processor 21 generates a second welding program by correcting the first welding program based on the repair portion information when the number of defective portions included in the welded portion indicated by the repair portion information is larger than a predetermined threshold, and determines the second welding program according to the welded portion when the number of the defective portions is not larger than the predetermined threshold. Accordingly, more efficient repair welding can be performed according to the situation.

Further, the processor 21 generates the second welding program by correcting the first welding program based on the repair portion information when the welded portion indicated by the repair portion information includes defective portions such that a distance between the defective portions is smaller than a predetermined threshold, and determines the second welding program according to the welded portion when the welded portion indicated by the repair portion information does not include defective portions such that a distance between the defective portions is smaller than the predetermined threshold. Accordingly, more efficient repair welding can be performed according to the situation.

Although the various embodiments are described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Further, components in the various embodiments described above may be combined optionally in the range without deviating from the spirit of the invention.

The present disclosure is useful as a repair welding control device and a repair welding control method capable of controlling repair welding.

What is claimed is:

1. A repair welding control device, comprising:
a memory; and
a processor,
wherein the processor is configured to:
acquire repair portion information indicating a welded portion where repair welding is to be performed among welded portions in a workpiece welded by a first welding program;
generate a second welding program by correcting the first welding program based on the repair portion information to change a welding direction of the welded portion in the first welding program to a reverse direction in the second welding program when the repair portion information indicates that a defect is located in a second half of the welded portion; and
control a welding machine using the second welding program to perform the repair welding in the reverse direction on the welded portion where the repair welding is to be performed.

2. A repair welding control device, comprising:
a memory; and
a processor,
wherein, the processor is configured to:
acquire repair portion information indicating a welded portion where repair welding is to be performed among welded portions in a workpiece welded by a first welding program;
generate a second welding program by correcting the first welding program or select a second welding program from a plurality of repair welding programs generated in advance according to the welded portion, based on the repair portion information in accordance with a predetermined branching condition; and
control a welding machine using the second welding program to perform the repair welding on the welded portion where the repair welding is to be performed;
wherein the processor is configured to
generate the second welding program by correcting the first welding program based on the repair portion information in a case that a number of defective portions included in the welded portion indicated by the repair portion information is larger than a predetermined threshold, and select the second welding program from the plurality of repair welding programs according to the welded portion in a case that the number of the defective portions is not larger than the predetermined threshold.

3. A repair welding control device, comprising:
a memory; and
a processor,
wherein, the processor is configured to:
acquire repair portion information indicating a welded portion where repair welding is to be performed among welded portions in a workpiece welded by a first welding program;
generate a second welding program by correcting the first welding program or select a second welding program from a plurality of repair welding programs generated in advance according to the welded portion, based on the repair portion information in accordance with a predetermined branching condition; and
control a welding machine using the second welding program to perform the repair welding on the welded portion where the repair welding is to be performed;
wherein the processor is configured to
generate the second welding program by correcting the first welding program based on the repair portion information in a case that the welded portion indicated by the repair portion information includes defective portions in which a distance between the defective portions is smaller than a predetermined threshold; and
select the second welding program from the plurality of repair welding programs according to the welded portion in a case that the welded portion indicated by the repair portion information does not include defective portions in which a distance between the defective portions is smaller than the predetermined threshold.

* * * * *